Patented June 7, 1927.

1,631,671

UNITED STATES PATENT OFFICE.

GUSTAVE F. DREHER, OF SCHENECTADY, NEW YORK, ASSIGNOR TO GENERAL ELECTRIC COMPANY, A CORPORATION OF NEW YORK.

WATERPROOF CEMENTING COMPOSITION.

No Drawing.   Application filed March 8, 1922. Serial No. 542,082.

My invention relates particularly to the manufacture of plyboard or pressboard, that is, material consisting of thin laminæ of wood bound together by a cement but it is not limited in its advantageous application to this particular material. It is the object of my invention to provide a cementing composition which will retain its mechanical strength when in contact with water for a long time so that a plyboard or other composite article containing my improved cement may be subjected to severe service under climatic conditions without injury.

My improved material contains a cement comprising a mixture of blood albumin and gelatine, or animal glue, combined with formaldehyde. The formaldehyde preferably is derived from a compound which itself will not harden the cement but which may be decomposed by heat while the materials to be cemented are subjected to pressure.

When carrying out my invention, I first prepare a suitable mixture of blood albumin and animal glue. Altho the proportions may be varied, I have found satisfactory a mixture of 62 pounds of blood albumin and 16 pounds of gelatine, for example, hide glue, these constituents preferably being dissolved separately in water and then mixed. The amount of water in the combined solution should be about 122 pounds. To this solution I add the compound capable of rendering the albumin and gelatine hard, tough and insoluble. I prefer to employ for this purpose hexamethylene tetramine commercially known as hexa, which may be prepared by mixing solutions of ammonia and formaldehyde. I may use for its preparation a mixture comprising one quart of ammonia (26° Bé.) and one quart formaldehyde (40%). As a considerable amount of heating and foaming occurs when the ammonia and formaldehyde react these ingredients are separately mixed, a quart of water being added to slow up the reaction and to cool the mixture. The mixture of the albumin, gelatine and the hexamethylene tetramine solution thus prepared is stirred for about one-half hour and then is ready for use.

The thin solution thus prepared is spread upon the sheets or plates of wood, fabric, paper or other materials to be united. When the plates are assembled heat and pressure are applied to convert the mixture to an insoluble state. The pressure may vary with the character of the laminæ. When preparing plywood from thin sheets of hard maple, I may use a pressure of 300 to 400 pounds per square inch. During the heating which may occur at 120° C. or thereabouts, the hexamethylene tetramine chemically hardens and renders insoluble the other ingredients. The formaldehyde is set free which combines with the gelatine and hardens the same, and the heat applied hardens the albumin.

Plyboard containing my improved cement is extremely resistant to water. It may be soaked for an indefinite length of time in cold water without causing the cemented surfaces to open up. It may be boiled for several days in water without disintegration, particularly when the laminæ are as thin as $\frac{1}{16}$ inch or less. The plywood will withstand heating to 100° C. without injury. The tensile strength of the product is so great that when torn apart in a testing machine, the break usually occurs in the wood fibre instead of at the cemented surfaces.

What I claim as new and desire to secure by Letters Patent of the United States, is:

1. A cement comprising blood albumin, gelatine and hexamethylene tetramine.

2. A cement, which is water resistant in the hardened condition, comprising a solution in water of blood albumin, gelatine and sufficient hexamethylene tetramine to render the albumin and gelatine hard, tough and insoluble upon heating.

In witness whereof, I have hereunto set my hand this 27th day of February, 1922.

GUSTAVE F. DREHER.